United States Patent
Choluj

(10) Patent No.: US 9,038,357 B2
(45) Date of Patent: May 26, 2015

(54) WINDGUARD MECHANISM OF A PICK-UP FOR AN AGRICULTURAL MACHINE

(71) Applicant: CNH America LLC, New Holland, PA (US)

(72) Inventor: Mariusz Choluj, Plock (PL)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/952,005

(22) Filed: Jul. 26, 2013

(65) Prior Publication Data

US 2014/0026533 A1    Jan. 30, 2014

(30) Foreign Application Priority Data

Jul. 27, 2012 (BE) .................................. 2012/0521

(51) Int. Cl.
    *A01D 43/00*    (2006.01)
    *A01D 89/00*    (2006.01)
    *A01F 15/08*    (2006.01)

(52) U.S. Cl.
    CPC .............. *A01D 89/008* (2013.01); *A01F 15/08* (2013.01)

(58) Field of Classification Search
    USPC ............................................. 56/190, 344, 364
    See application file for complete search history.

(56) References Cited

U.S. PATENT DOCUMENTS

| | | | |
|---|---|---|---|
| 3,676,988 A * | 7/1972 | Hauser-Lienhard | 56/1 |
| 4,539,798 A * | 9/1985 | Klinner | 56/16.4 R |
| 5,293,732 A * | 3/1994 | Vogelgesang et al. | 56/16.4 R |
| 6,877,304 B1 | 4/2005 | Smith et al. | |
| 6,962,041 B1 | 11/2005 | Taylor et al. | |
| 7,107,748 B2 * | 9/2006 | McClure | 56/190 |
| 7,448,196 B2 * | 11/2008 | Schrag et al. | 56/341 |
| 7,617,662 B2 * | 11/2009 | Erdmann et al. | 56/190 |
| 7,650,741 B2 * | 1/2010 | Graber et al. | 56/364 |
| 7,730,704 B2 | 6/2010 | Viaud | |
| 2010/0043370 A1 * | 2/2010 | Viaud et al. | 56/14.5 |

* cited by examiner

*Primary Examiner* — Alicia Torres
(74) *Attorney, Agent, or Firm* — Patrick M. Sheldrake; Seyed V. Sharifi T.

(57) ABSTRACT

A windguard mechanism comprising a pair of arms attachable to an agricultural machine and a windguard plate extending between the pair of arms and positioned to hold down crop material processed by a pickup mechanism. The windguard plate comprises a first plate fixed between the pair of arms and a second plate positioned movably with respect to the first plate, wherein working surfaces of the first plate and of the second plate form a windguard working surface of an area independent on the position of the second plate.

14 Claims, 5 Drawing Sheets

WINDGUARD MECHANISM OF A PICK-UP FOR AN AGRICULTURAL MACHINE

This application claims foreign priority under 35 U.S.C. §119 to Belgian Application BE2012/0521 filed Jul. 27, 2012 titled "A Windguard Mechanism of a Pick-up For An Agricultural Vehicle" and having Mariusz Choluj as the inventor. The full disclosure of BE2012/0521 is hereby incorporated herein by reference.

FIELD OF THE INVENTION

The present invention relates to a windguard mechanism for a pickup which can be used with an agricultural machine such as a round baler, a square baler, a forage harvester or a combine harvester.

BACKGROUND OF THE INVENTION

A pickup mechanism picks up crop material, such as hay, from the ground as the agricultural machine travels across the field, which is fed into the interior of the machine, e.g. a fixed or expandable chamber in the case of a round baler, where it is rolled up to form a compact cylindrical hay package.

Round balers have become quite prevalent for their capability of producing a conveniently sized cylindrical bale, very often automatically wrapped with a sheeting material such as net or film. The round balers generally have a bale-forming chamber defined by a pair of spaced-apart side walls and a plurality of parallel belts trained around a plurality of rolls spanning between the side walls. Although in the description, the invention is explained in relation to a round baler, such a windguard mechanism may be used in combination with a pick-up for any type of agricultural machine which picks up material from the floor to be fed into the machine.

The known pickup mechanisms are usually provided with a windguard mechanism, which holds down the crop material as it is being fed to prevent it from being blown off the pickup floor and to ensure an adequate compaction of the crop material for appropriate feeding into e.g. the stuffer mechanism. The position of the windguard plate should be adjusted relatively to the pickup roll depending on the type of crop material (i.e. its structure, thickness, length, density, moisture content etc.) in order to provide optimal compression while preventing jamming of the crop material between the pickup roll and the windguard plate. When material is jammed, the machine must be halted and the jam has to be manually cleared.

US Pat. No. 6,962,041 shows a windguard for a round baler, which comprises a single floating windguard plate that pivots at the front and the middle of the tine section. When an obstruction, e.g. a stone is taken up by the pick-up and being fed with the crop into the machine, the front part of the windguard will be able to pivot upwardly. When the obstruction moves rearwardly, the back part of the windguard will also be able to pivot upwardly, while the front part of the windguard will move downwardly. Such windguard assures that the tines maintain in contact with the crop at all times as it moves over the pick-up and across the stuffer assembly, even if a possible obstruction was picked up by the pick-up. However, the windguard of U.S. Pat. No. 6,962,041 is only allowed to move upwards or downwards with relation to the pick-up and its position is only changeable when the entire structure is demounted and repositioned.

U.S. Pat. No. 6,877,304 discloses a windguard for a round baler, which comprises dual floating windguards which are able to pivot around pivot points, cfr. the windguard of U.S. Pat. No. 6,962,041, causing the tines to maintain in contact with the crop at all times. Again, if a different position of the dual floating windguards is needed due to the fact that different crop is harvested, the entire windguard will need to be disassembled and repositioned with relation to the pick-up, before taking an optimal position for the specific crops.

The U.S. Pat. No. 7,730,704 presents an agricultural press comprising a windguard, also called a material hold-down device, which comprises a plate of a specific, constant size. The entire plate or windguard is movable over a first range of movement in response to changing swath thicknesses. If a material jam arises, the entire plate can be moved over a second range of movement in order to liberate the wedged material and to overcome the jam.

The known single-plate windguard mechanisms, wherein the plate is movable with respect to the pickup wheel, have the disadvantage that when the windguard is moved away from the pickup to accommodate larger crop material, the effectiveness of the guarding function decreases. As a result, the windguard may no longer block small pieces from escaping the pickup mechanism. This is especially problematic on rocky fields, where stones may escape the pickup and may hit the back of the tractor pulling the machine, causing e.g. breaking of the tractor window and forms an actual hazard to the operator.

In turn, the dual-plate windguard mechanisms allow more freedom in adjusting a proper guarding area even for larger distances from the pickup roll, but their cost and complexity is doubled with respect to the single-plate mechanism. Moreover, crop material may be jammed between the two plates which are distant from each other and form a non-uniform and non-continuous windguard surface.

SUMMARY OF THE INVENTION

Therefore, there is a need for an improved windguard mechanism for a pick-up, which has its position adjustable with respect to the pickup roll to accommodate different crop material and sizes and which provides adequate guarding irrespectively of its position.

The object of the invention is a windguard mechanism for use with a pickup mechanism of an agricultural machine, the windguard mechanism comprising a pair of arms directly or indirectly attachable to the agricultural machine and a windguard plate extending between the pair of arms and positioned to hold down the crop material processed by the pickup mechanism. The windguard plate comprises a first plate member fixed between the pair of arms and a second plate member positioned movably with respect to the first plate member, wherein the working surfaces of the first plate member and of the second plate member form a substantially continuous windguard working surface of an area independent on the position of the second plate member.

Preferably, the first plate member comprises a plate having a working surface and at least two upstanding sides positioned on each side of the plate, and the second plate member comprises a plate having a working surface and at least two upstanding sides positioned on each side of the plate.

Preferably, at least two upstanding sides of the first plate member comprises a guiding slot and the at least two upstanding sides of the second plate member is provided with guide bolts movable in the guiding slot.

Preferably, each arm comprises a guiding slot and the second plate member is provided with guide bolts movable in the guiding slot.

Preferably, the guide bolts are releasably connected to the second plate member by means of nuts.

Preferably, an actuator is connected to the second plate member to move the second plate member in relation to the first plate member.

Preferably, the actuator is controlled by a control system, the control system being able to receive input from an operator when operating the agricultural machine.

Preferably, the working surface of the second plate member is larger than the working surface of the first plate member such that the second plate member is able to slide completely over the first plate member thus enveloping at least a part of the first plate member.

Preferably, the working surfaces of the first plate member and of the second plate member are substantially planar and the guiding slot is straight.

Preferably, the guiding slot and the working surfaces of the first plate member and of the second plate member are curved and the guiding slot has a curvature corresponding to the curvature of the working surfaces.

Preferably, the second plate member is spaced apart from the first plate member, and wherein a ramp is foreseen to close of the gap between the first and second plate member.

Preferably, the mechanism further comprises a roller attached to the pair of windguard arms via a pair of roller arms.

Preferably, the second plate member is movable away from the agricultural machine so as to extend the continuous working surface.

Preferably, the windguard mechanism is used with a pickup for an agricultural baler.

The windguard mechanism according to the invention provides freedom in adjusting appropriate area of the windguard plate according to the type of collected crop material, wherein the windguard plate forms a uniform, continuous surface.

Particular and preferred aspects of the invention are set out in the accompanying independent and dependent claims. Features from the dependent claims may be combined with features of other dependent claims as appropriate and not merely as explicitly set out in the claims.

BRIEF DESCRIPTION OF THE DRAWINGS

Although the invention will be explained in relation to a pick-up and windguard for a round baler, the person skilled in the art will understand that the present invention may be used on a pick-up and windguard for any agricultural machine.

The object of the invention is shown by means of exemplary embodiment on a drawing, in which.

DETAILED DESCRIPTION OF THE INVENTION

Figure 1:
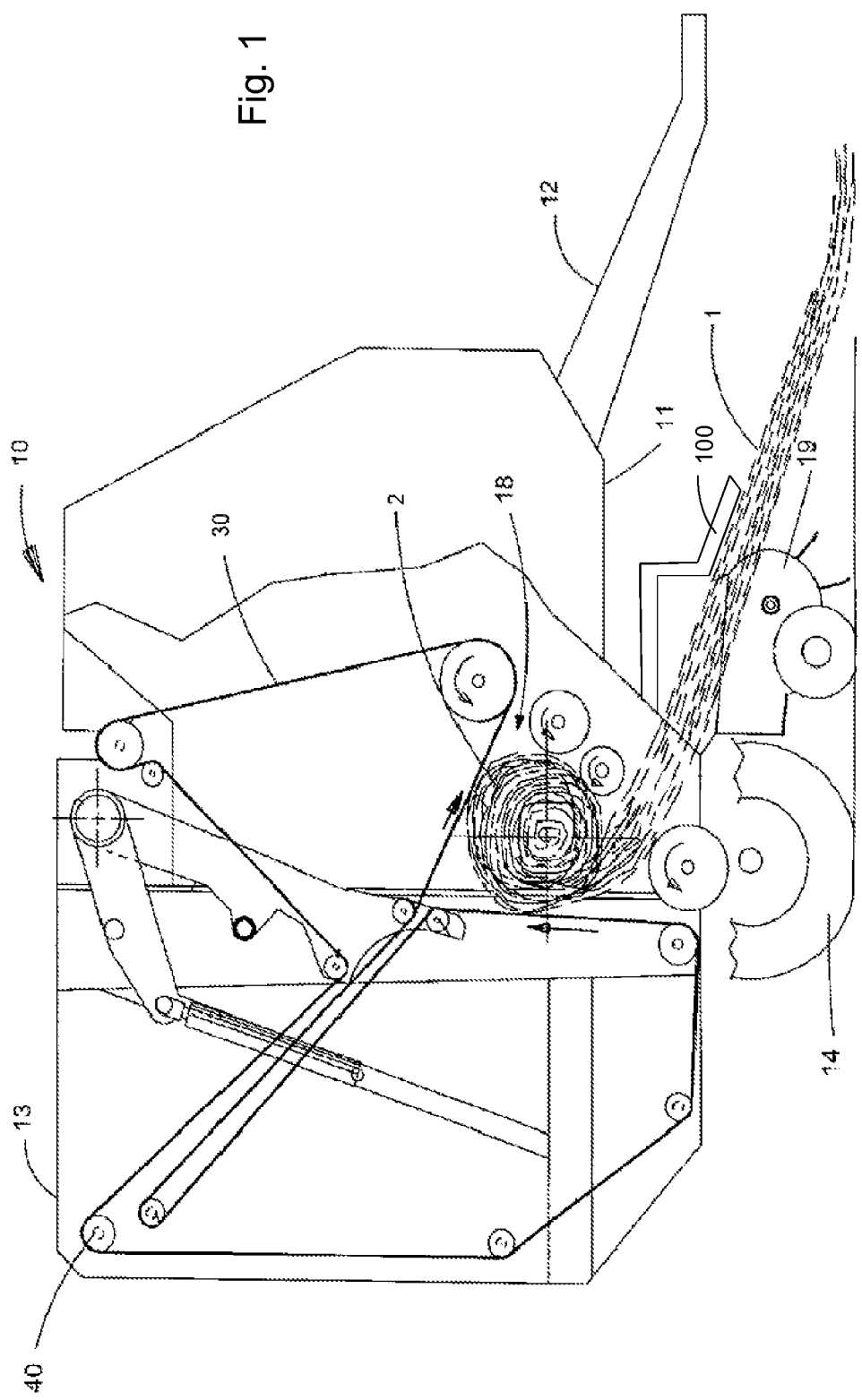
FIG. 1 shows a side view of a typical agricultural round baler.

FIG. 1 shows a typical round baler 10, which comprises a main frame 11 terminating forwardly in a tongue 12 and rearwardly, slightly beyond a transverse axle to which a pair of wheels 14 (only one shown) are mounted, thus forming a wheel supported main frame. The main frame 11 supports a plurality of movable belts 30 running along transversely arranged rolls 40, which together with a pair of generally parallel and opposing sidewalls establish an expandable bale-forming chamber 18. Cut crop material 1 is picked up by a transverse pickup roll 19 and fed into the bale-forming chamber 18 where it is formed into a cylindrically shaped bale 2 by movement of the belts 30. A completed bale 2 is then wrapped with twine or a wrapping material to maintain the bale shape after ejection from the baler. Upon completion of the wrapping process, the tailgate 13 pivots upwardly to open the rearward portion of the bale forming chamber 18 and the bale 2 is ejected onto the ground.

A windguard mechanism 100 is attached to the baler nearby the pickup roll 19 and configured to hold down the crop material 1 processed by the pickup roll 19, such as to effect compaction of the crop and prevent the crop and other objects, such as stones, collected by the pickup roll 19, from being thrown away from the baler.

Figure 2:
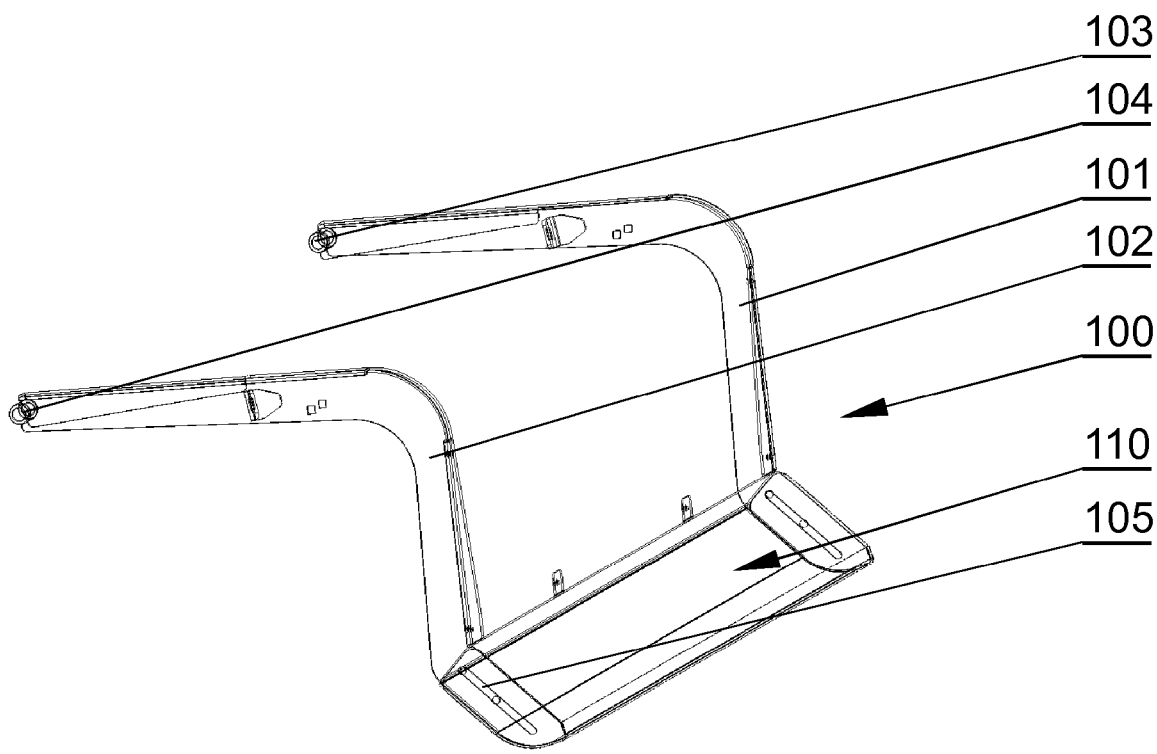
FIGS. 2 and 3 show a first embodiment of the windguard mechanism in a compacted configuration and extended configuration, respectively.
Figure 3:
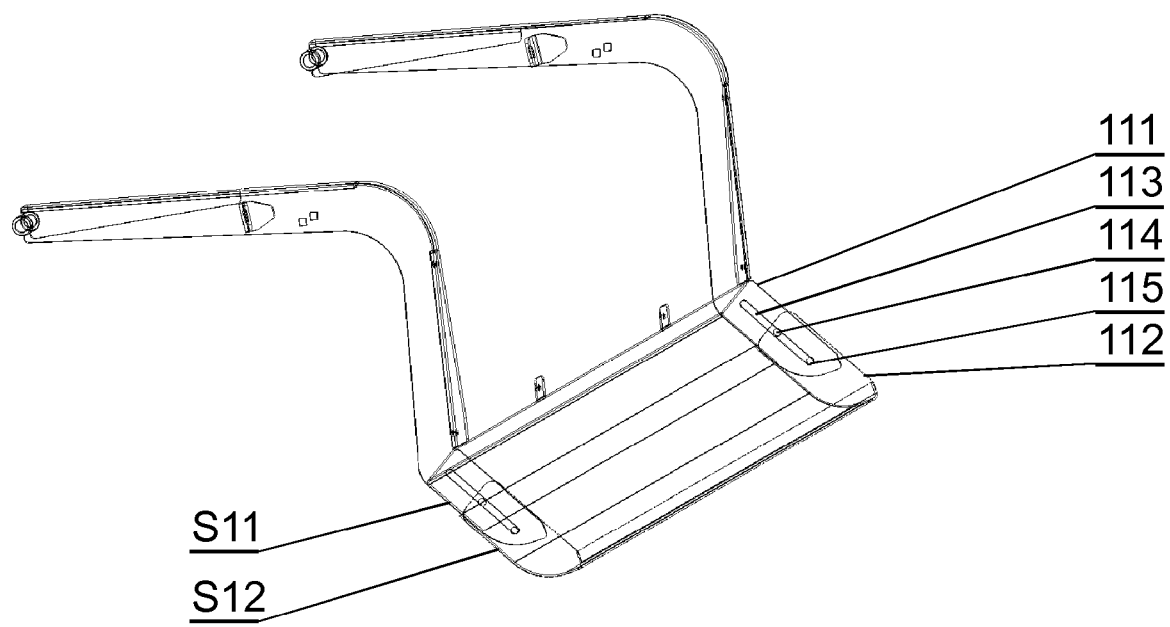
Figure 4:
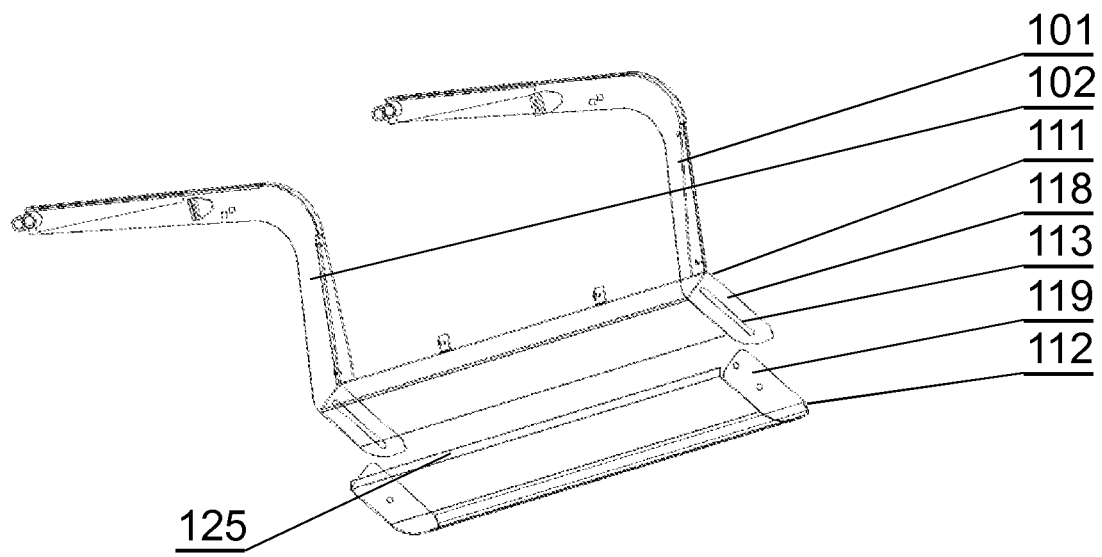
FIG. 4 shows an exploded view of the first embodiment of the windguard mechanism.

FIGS. 2 and 3 show a first embodiment of the windguard mechanism 100 in a compacted and extended configuration, respectively, and FIG. 4 shows an exploded view thereof. The windguard mechanism 100 comprises a pair of arms 101, 102 attachable, for example via pivotable joints 103, 104, to the chassis of the baler. Alternatively, the pair of arms 101, 102 may be connected to the pickup itself, which in turn is connected to the chassis of the baler. A windguard plate 110 extends between the pair of arms 101, 102. The windguard plate 110 is formed by a first, fixed plate member 111 and a second, movable plate member 112 movable with respect to the first plate member 111. The fixed plate member 111 is formed by a plate having a flat working surface S11 and upstanding sides which are connected to the pair of arms 101,102. A top plate (not shown for clarity of the drawing) may also be provided to improve the structural rigidity of the fixed plate member 111. The movable plate member 112 is also formed by a plate having a flat working surface S12 and upstanding sides. Again, a top plate (not shown for clarity of the drawing) may be provided to improve the structural rigidity of the movable plate member 112. The movable plate member 112 is designed to be a bit larger than the fixed plate member 111, so that the movable plate member 112 is able to move over the fixed plate member 111 like a box in a box. The flat working surface S12 is thus able to slide over the flat working surface S11 and the upstanding sides of the movable plate member 112 are able to slide next to the upstanding sides of the fixed plate member 111. When mounted, the working surfaces S11,S12 of both plate members 111, 112 form a substantially continuous windguard working surface, independent of the relative position of the movable plate member 112 in relation to the fixed plate member 111. Because the movable plate member 112 is able to slide over the fixed plate member 111, the working surface S12 will be above the working surface S11 at all times, thus forming a continuous working surface. The crops, when sliding over the working surface S12 towards the working surface S11 and into the baler, will thus not be able to get stuck in between the two plate members, since a sliding contact is foreseen at all times between the two plate member. Alternatively, the movable plate member 112 may be constructed such that the working surface S12 may be distanced away from the working surface S11, thus forming a gap between the working surfaces S11 and S12, preventing contact and friction between the two working surfaces S11,S12. The end of the working surface S12 will then be bended towards the working surface S11 contacting the working surface S11 to form a ramp 125 as shown in FIG. 4, such that the gap between the two working surfaces S11 and S12 is closed off. Again, blockage of crop in between the two plate members is again prevented.

The first plate member 111 is fixed to the pair of arms 101, 102 and the second plate member 112 is movable along a guide 105 formed in the upstanding sides 118 of the first plate member 111 or alternatively in a guide formed in the arms 101, 102. The second plate member 112 is movable from a first position as shown in FIG. 2 (i.e. the windguard mechanism in a compacted configuration), in a direction away from the baler to a second position as shown in FIG. 3 (i.e. the windguard mechanism in an extended configuration). In the presented embodiment, the guide 105 comprises a guiding slot 113 and bolts 114,115 fitted to slide into the guiding slot 113. When mounted, the bolts 114,115 are placed through the guiding slot 113 and through a hole in the upstanding sides 119 of the movable plate member 112 such that the bolts 114,115 are able to move along the slot 113 to move the movable plate member 112 in relation to the fixed plate member 111. The guide bolts 114, 115 can be provided with nuts 116, 117 (as indicated on FIG. 6) on the outside of the movable plate member 112 to secure and immobilize the movable plate member 112 with respect to the fixed plate member 111. Therefore, in field, the operator of the baler may freely adjust the effective area of the working surface of the windguard plate 110 by adjusting the position of the second plate member 112 with respect to the first plate member 111. The operator simply needs to release the nuts 116 and 117, move the movable plate member 112 in relation to the fixed plate member 111 by sliding the guide bolts 114,115 inside the slot 113, and securing the nuts 116,117 again so that the movable plate member 112 is again immobilized in relation to the fixed plate 111.

In the first embodiment, the working surfaces S11, S12 of the plate members 111, 112 are substantially planar and the guiding slot 113 is straight.

Figure 5:
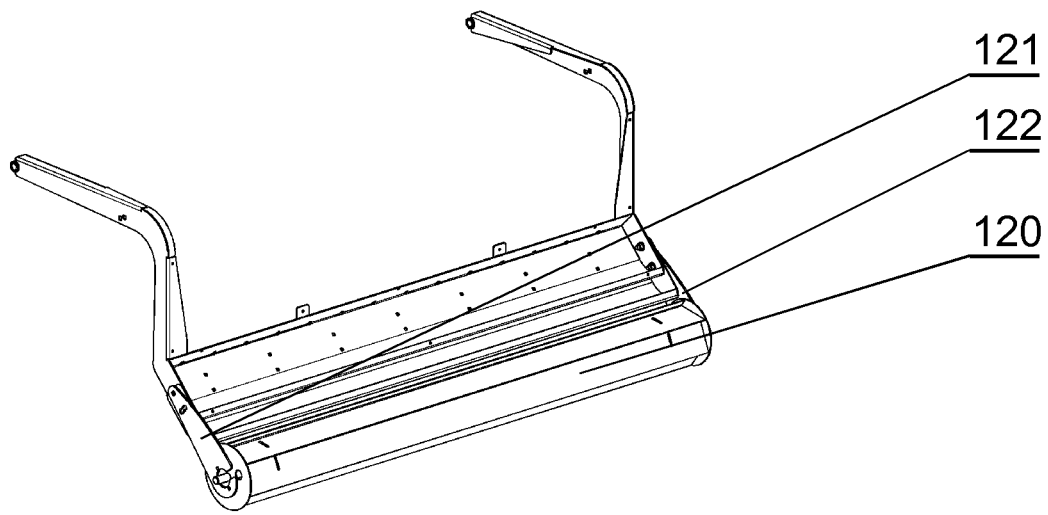
FIG. 5 shows a second embodiment of the windguard mechanism.

FIG. 5 shows a second embodiment of the windguard mechanism, which is equivalent to the first embodiment, but further comprises a roll 120 attached via a pair of roll arms 121, 122 to the pair of windguard arms 101, 102. The roll is a known mechanism used to increase the pickup efficiency. The second plate member 112 is therefore movable between the first plate member 111 and the roll 120.

Figure 6:
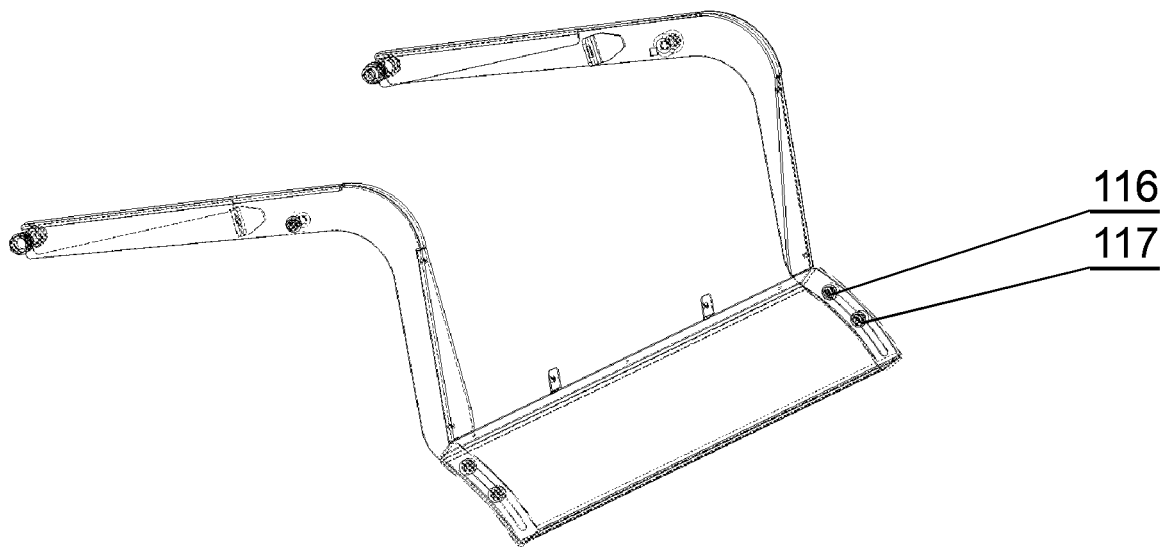
FIGS. 6 and 7 shows a third embodiment of the windguard mechanism in a compacted configuration and extended configuration, respectively.
Figure 7:
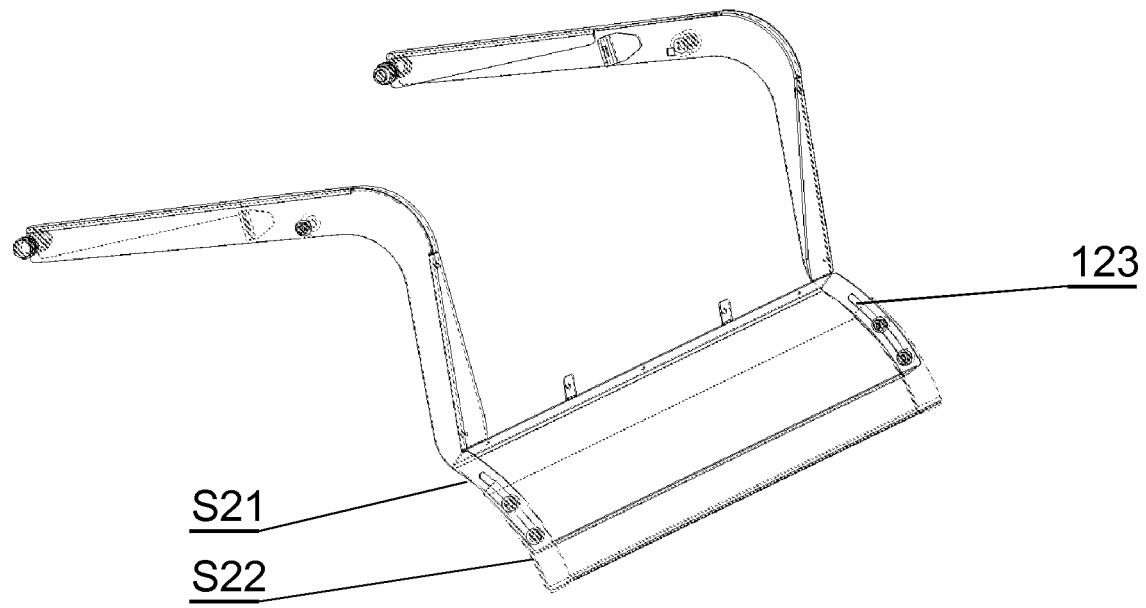

FIGS. 6 and 7 show a third embodiment of the windguard mechanism in a compacted and extended configuration, respectively, which is equivalent to the first embodiment, with the following differences. The working surfaces S21, S22 of the plate members are curved and the guiding slot 123 has a curvature corresponding to the curvature of the working surfaces S21, S22. The curvature allows more efficient pickup of certain kinds of crop.

A combination of the different embodiments, being straight or with a curvature, with more than one movable plate member, or with or without an additional roll is also possible and comprised within the invention.

Figure 8:
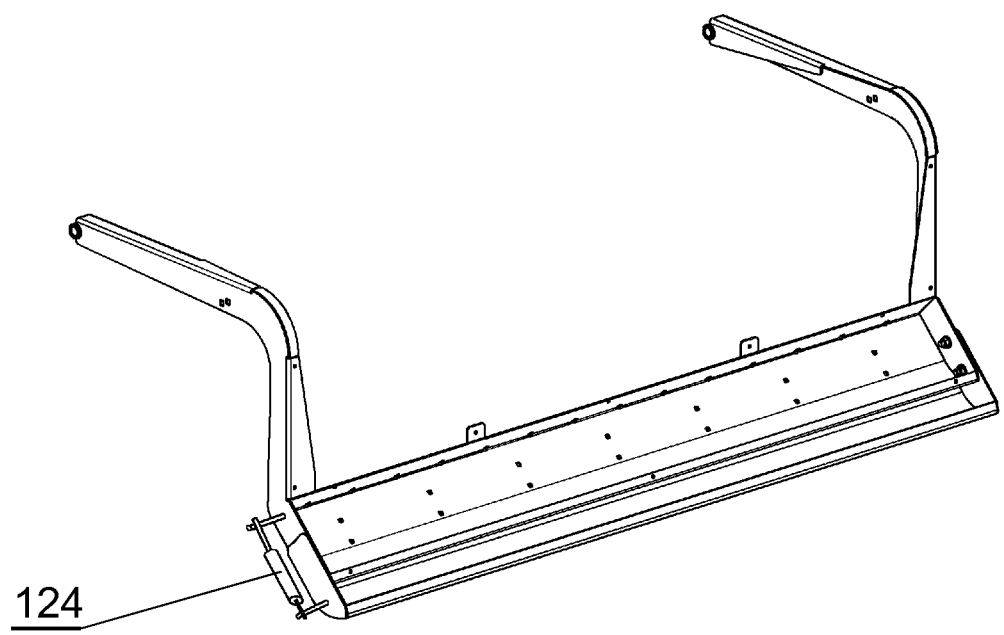
FIG. 8 shows a fourth embodiment of the windguard mechanism.

Additionally and as an alternative, the movement of the movable plate member 112 can be done automatically by using e.g. an hydraulic cylinder 124 pushing or pulling the movable plate member 112 over the fixed plate member 111, as shown in FIG. 8. The operator of the tractor can then adjust the windguard position depending on the specific crops or the amount of stones which are picked up by the pickup by selecting a specific setting in a control system without the need to stop the machine and adjust the position manually. The control system will then adjust the position of the movable plate member 112 by moving the hydraulic cylinder 124.

It is to be understood that the presented embodiments describe only the most characteristic features of the invention. A skilled person will realize that various modifications may be made to the presented embodiments, such as implementing the features known from other windguard mechanisms, related to adjustment of position of the windguard plate with respect to the pickup roll, attachment of the windguard mechanism to the baler, attachment of additional equipment to the windguard mechanism, etc.

The invention claimed is:

1. A windguard mechanism for use with a pickup mechanism of an agricultural machine, the windguard mechanism comprising:
    a pair of arms directly or indirectly attachable to the agricultural machine and a windguard plate extending between the pair of arms and positioned to hold down crop material processed by the pickup mechanism,
    the windguard plate comprising a first plate member fixed between the pair of arms and a second plate member positioned movably with respect to the first plate member, wherein respective first and second working surfaces of the first plate member and of the second plate member form a substantially continuous windguard working surface independent of the position of the second plate member; wherein both the first plate member and second plate member further comprise at least one vertical side portion connected to a plate forming at least a portion of the respective working surface; wherein the first plate member and second plate member are moveably connected through the at least one side portion of the first plate member and at least one side portion of the second plate member.

2. A windguard mechanism for use with a pickup mechanism of an agricultural machine, the windguard mechanism comprising:
    a pair of arms directly or indirectly attachable to the agricultural machine and a windguard plate extending between the pair of arms and positioned to hold down crop material processed by the pickup mechanism,
    the windguard plate comprising a first plate member fixed between the pair of arms and a second plate member positioned movably with respect to the first plate member, wherein respective first and second working surfaces of the first plate member and of the second plate member form a substantially continuous windguard working surface independent of the position of the second plate member;
    wherein the first plate member comprises a plate that includes the first working surface and at least one upstanding side connected to each side of the plate, and the second plate comprises a plate that includes the second working surface and at least one upstanding side connected to each side of the plate, wherein at least one side of the first working surface is movably connected to at least one side of the second working surface.

3. The windguard mechanism according to claim 2, wherein the upstanding sides of the first plate member comprise a guiding slot and the upstanding sides of the second plate member are provided with guide bolts movable in the guiding slot.

4. The windguard mechanism according to claim 1, wherein each arm comprises a guiding slot and the second plate member is provided with guide bolts movable in the guiding slot.

5. The windguard mechanism according to claim 3, wherein the guide bolts are releasably connected to the second plate member by nuts.

6. The windguard mechanism according to claim 1, wherein an actuator is connected to the second plate member to move the second plate member in relation to the first plate member.

7. The windguard mechanism according to claim 6, wherein the actuator is controlled by a control system, the control system being able to receive input from an operator when operating the agricultural machine.

8. The windguard mechanism according to claim 2, wherein the working surface of the second plate member is larger than the working surface of the first plate member such that the second plate member is able to slide completely over the first plate member thus enveloping at least a part of the first plate member.

9. The windguard mechanism according to claim 3, wherein the working surfaces of the first plate member and of the second plate member are substantially planar and the guiding slot is straight.

10. The windguard mechanism according to claim 3, wherein the guiding slot and the working surfaces of the first plate member and of the second plate member are curved and the guiding slot has a curvature corresponding to the curvature of the working surfaces.

11. The windguard mechanism according to claim 1, wherein the second plate member is spaced apart from the first plate member, and wherein a ramp is configurable to close a gap between the first and second plate members.

12. The windguard mechanism according to claim 1, further comprising a roller attached to the pair of windguard arms via a pair of roller arms.

13. The windguard mechanism according to claim 1, wherein the second plate member is movable away from the agricultural machine so as to extend the continuous working surface.

14. The windguard mechanism according to claim 1, wherein the windguard mechanism is used with the pickup for the agricultural machine.

* * * * *